United States Patent [19]

Klees

[11] 3,995,205
[45] Nov. 30, 1976

[54] VEHICLE MANEUVERING CONTROL SYSTEM

[75] Inventor: George N. Klees, Fullerton, Calif.
[73] Assignee: Rockwell International Corporation, El Segundo, Calif.
[22] Filed: Apr. 24, 1975
[21] Appl. No.: 571,023

[52] U.S. Cl. .............................. 318/588; 318/589; 318/654; 318/591; 318/626
[51] Int. Cl.² .......................................... G05D 1/00
[58] Field of Search ........... 318/654, 655, 656, 588, 318/589, 591, 626

[56] References Cited

UNITED STATES PATENTS

| | | | |
|---|---|---|---|
| 2,852,724 | 9/1958 | Bargen | 318/655 X |
| 2,891,205 | 6/1959 | Freeman | 318/591 |
| 3,019,377 | 1/1962 | Morgan, Jr. et al. | 318/626 |
| 3,485,463 | 12/1969 | Miller | 318/626 X |
| 3,841,589 | 10/1974 | Appleby et al. | 318/655 X |
| 3,888,201 | 6/1975 | Zuvela | 318/591 X |

Primary Examiner—Benjamin Dobeck
Attorney, Agent, or Firm—H. Fredrick Hamann; Rolf M. Pitts

[57] ABSTRACT

A maneuvering control system particularly for use in controlling a vehicle such as a submarine or surface craft, which utilizes both manual and automatic control. Electrical signals in accordance with the manipulation of a manual control device are generated by means of a synchro transmitter and fed to a synchro differential transmitter. Automatic control signals generated in an automatic control signal generator are converted to a mechanical form by a synchro follower which provides a mechanical input to the differential transmitter. Adjustable limit stops are provided for the synchro follower output shaft to limit the automatic signal input to the differential transmitter, thereby preventing an "out-of-control" condition in the event of a malfunction in the automatic control signal generator. The output of the differential transmitter which represents the algebraic sum of the manual and automatic inputs is used to drive a synchro control transformer, which in turn drives a servo amplifier. The output of the servo amplifier is used to control drive means which drives the maneuvering means (rudder, planing member, etc.) being controlled. Switching means is also provided to bypass the automatic control system to provide exclusive manual control when desired.

6 Claims, 2 Drawing Figures

VEHICLE MANEUVERING CONTROL SYSTEM

BACKGROUND OF THE INVENTION

This invention relates to a system for controlling the maneuvering of a vehicle and more particularly to such a system suitable for use in controlling the rudder or plane of a submarine or the rudder of a surface vessel which affords alternative manual or automatic control.

In control systems for vehicles such as submarines and surface craft, servo systems utilizing synchros are generally utilized to implement the control of the maneuvering members (rudder, planes, etc.) in response to both manual and automatically generated control inputs. In many systems of the prior art, it is necessary for the operator to actuate a "mode" switch to change operation from automatic to manual and vice versa. In an emergency situation where immediate manual control is needed, this causes a lag in manual take-over which is highly undesirable. Further, in the event of a malfunction in the automatic control system, the rudder or plane could be driven radically to cause a dangerous vehicle maneuver. Many systems of the prior art have no means for preventing this from occurring. Systems that have been developed in the prior art for preventing out-of-control maneuvering in the event of a malfunction in the automatic control system tend to be overly complicated and costly in their implementation, and as with most complicated systems, tend to have less reliability than simpler implementations.

The present invention overcomes the aforementioned shortcomings of the prior art in providing a simple and highly reliable servo system utilizing synchros in its implementation, wherein manual override of the automatic control system is afforded at all times without need for operating any switches or the like. Further, in the system of the invention, the amount of automatic control possible is limited in a simple and reliable manner so that it is virtually impossible for an "out-of-control" condition to occur in the event of malfunction of the automatic control system.

It is therefore an object of this invention to provide an improved maneuvering control system for a vehicle having both manual and automatic control inputs.

It is a further object of this invention to provide a vehicle maneuvering control system in which immediate manual override of automatic control is afforded.

It is still another object of this invention to provide a vehicle maneuvering control system having highly reliable means for preventing undesirable radical maneuvers in the event of a malfunction of the automatic control system.

SUMMARY OF THE INVENTION

Manual control signals such as for the control of the rudder or planes of a submarine or the rudder of a surface vessel are generated by means of a mechanical-electrical transducer coupled to the ship's wheel or plane controls. These signals are fed to a differential signal generator. Automatic control signals for the vehicle are converted from electrical to mechanical form by means of an electrical-mechanical transducer and are fed as a mechanical input to differential signal generator means. The differential signal generator provides an electrical output representing the algebraic sum of the manual and automatic control signals. Limit stop means is provided for the electro-mechanical transducer to limit its travel so that radical high level outputs from the automatic control signal generator are effectively eliminated from the transducer output. The manual control signals are fed to the differential signal generator at all times so that they can immediately override the automatic control signals. The output of the differential signal generator means is utilized to drive control transformer means which in turn drives a control amplifier, this amplifier providing the drive signals for the drive mechanism for the rudder, plane, or other vehicle maneuvering means.

DESCRIPTION OF THE PREFERRED EMBODIMENT

Figure 1:
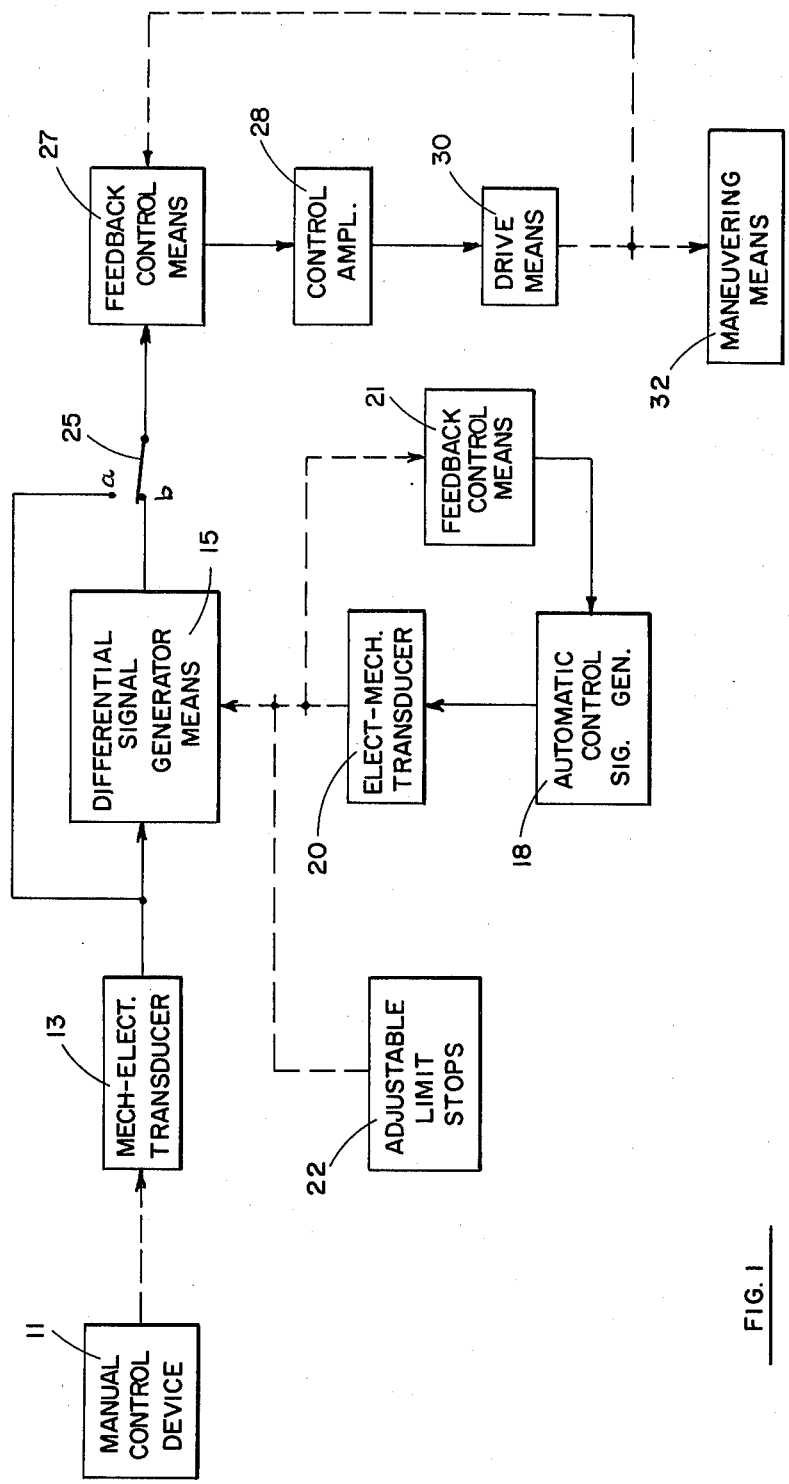
FIG. 1 is a functional block diagram illustrating the basic elements of the system of the invention.

Referring now to FIG. 1, a functional block diagram illustrating the basic elements of the system of the invention is shown. Manual control device 11, which may comprise the ship's wheel or the plane controls of a submarine, is mechanically coupled to a mechanical-electrical transducer 13 which may comprise a synchro transmitter. The output of transducer 13 is fed to differential signal generator means 15, which may comprise a synchro differential transmitter. Automatic control signal generator 18 provides automatic control signals for the vehicle to electrical-mechanical transducer 20, which may comprise a DC torquer or a synchro follower. The output of electrical-mechanical transducer 20 is a mechanical signal which is fed to differential signal generator means 15. The magnitude of this mechanical signal is limited by means of adjustable limit stops 22, thus limiting the magnitude of the automatic control signals fed to the system, the amount of such limiting being adjustable. A mechanical signal indicative of the position of the shaft of transducer 20 is provided to feedback control means 21 which may comprise a synchro resolver. Feedback control means 21 provides an electrical negative feedback to automatic control signal generator to effectively "zero" out the automatic control signal once a mechanical response thereto has been achieved.

The output of differential signal generator means is the algebraic sum between the manual and automatic control signals, this output being fed through switch 25 to feedback control means 27, which may comprise a synchro control transformer. If strictly manual control is desired, switch 25 may be thrown to the *a* position to bypass the differential signal generator means. The output of feedback control means 27 is fed to control amplifier 28 which amplifies the control signal and provides control signals for drive means 30. Drive means 30 is utilized to drive maneuvering means 32 which may comprise the vehicle's rudder or planing system. A mechanical feedback signal is provided from drive means 30 to feedback control means 27 to effectively "zero" out the control signal once the desired movement of the maneuvering means has been accomplished.

The system of the invention, as can be seen, has two major significant features. First, manual control is connected in the system at all times so that it can be used to override automatic control instantaneously. Secondly, means are provided to limit the magnitude of automatic control signals that can be introduced into the system so that a malfunction in the automatic control will not cause radical, dangerous maneuvers of the vessel.

Figure 2:
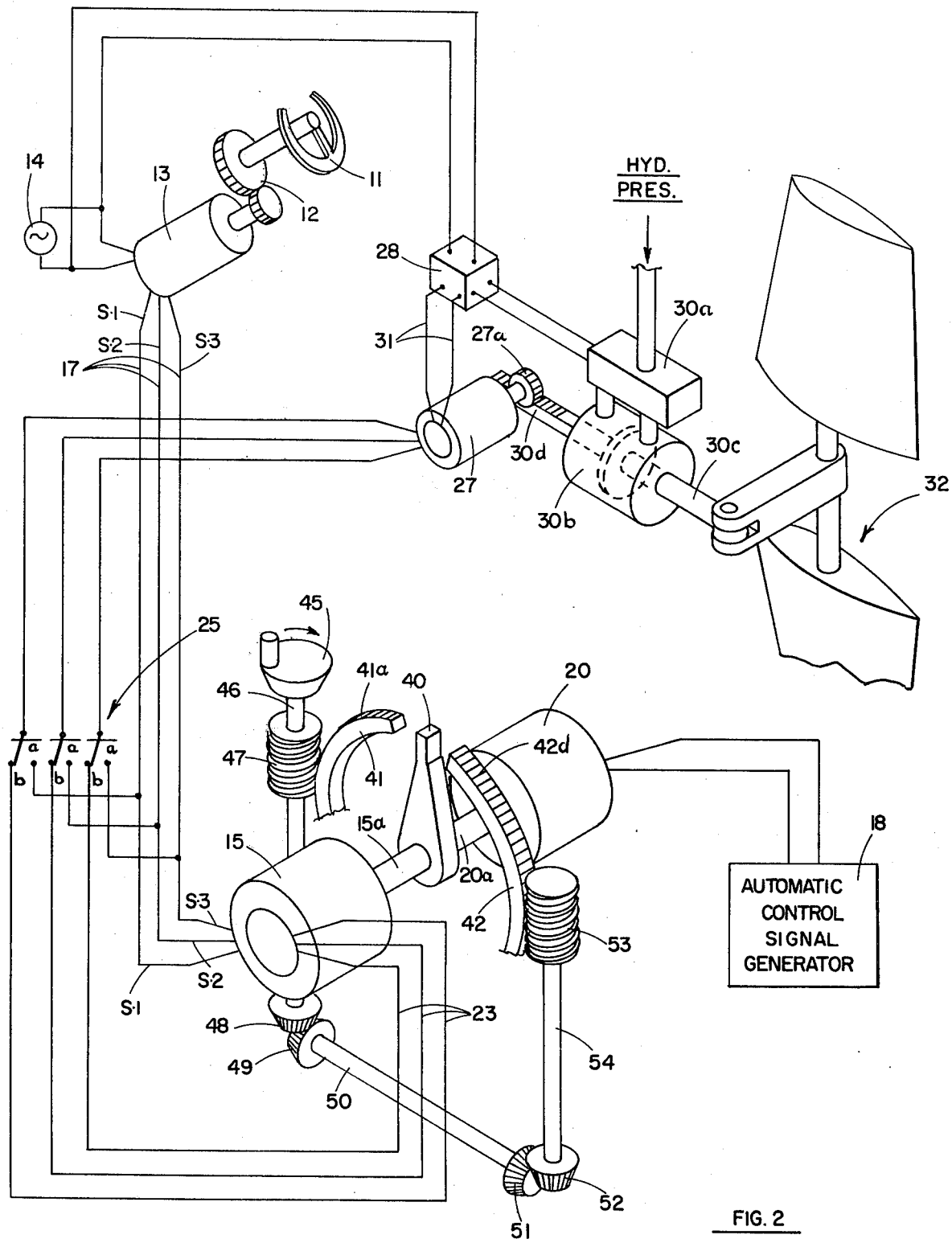
FIG. 2 is a schematic drawing illustrating the preferred embodiment of the invention.

Referring now to FIG. 2, a preferred embodiment of the invention is schematically illustrated. Wheel 11 which may be a vessel's wheel or planing control is coupled to gear train 12, which in turn drives the shaft of synchro transmitter 13. Synchro 13 receives excitation from AC power source 14. The output of synchro transmitter 13 which represents the rotational displacement of wheel 11 from a predetermined "centered" position is fed on lines 17 to the input of synchro differential transmitter 15.

Automatic control signals are fed from automatic control signal generator 18 to the input of DC torquer 20. The output shaft 20a of DC torquer 20 is rotatably driven in accordance with the automatic control signal provided thereto by automatic control signal generator 18. This mechanical signal is provided as an input to the shaft 15a of differential transmitter 15 which is fixedly coupled to shaft 20a by coupling means (not shown). Shaft 20a is also coupled to a synchro resolver (not shown) to provide a negative feedback to the automatic control signal generator, as described in connection with FIG. 1. Differential transmitter 15 thus receives a mechanical input responsive to the output of automatic control signal generator 18 and an electrical input responsive to manipulation of wheel 11. The output of differential transmitter 15, which is the algebraic sum of the inputs thereto, is fed on lines 23 through switch 25 to synchro control transformer 27. The output of control transformer 27 is fed on lines 31 to control amplifier 28 which amplifies the signals and provides a control signal in accordance therewith for hydraulic control valve 30a. Control valve 30a controls the operation of hydraulic ram 30b, the drive shaft 30c of the ram operating to actuate the rudder assembly 32 of the vessel. Also connected to the piston 30e of the hydraulic ram is rack 30d which drives pinion 27a, this pinion being connected to the shaft of control transformer 27. Mechanical negative feedback is thus fed to control transformer 27 to effectively zero out the control signal once the commanded actuation of the rudder has been accomplished.

Fixedly attached to shafts 15a and 20a is stop arm 40. Fixedly mounted on opposite sides of stop arm 40 are a pair of hard mechanical stops 41 and 42. These stops provide positive limits to the movement of arm 40 in either direction and thus to the shafts 15a and 20a to which this arm is fixedly attached. The degree of movement of arm 40 and thus of shafts 15a and 20a can be adjusted by setting the positions of stop members 41 and 42. This can be achieved by means of hand crank 45 which is coupled to shaft 46. Fixedly attached to shaft 46 is worm gear 47 which engages gear teeth 41a formed on stop member 41. Also attached to shaft 46 is gear 48 which rotatably drives gear 49 to cause rotational drive of shaft 50 to which the last mentioned gear is attached. This in turn causes the rotation of worm gear 53 which is fixedly attached to shaft 54, this end result being achieved through the intermediary of gear 52 which is attached to shaft 54 and which engages gear 51 attached to shaft 50. Worm gear 53 engages teeth 42a formed on stop 42. It thus can be seen that if crank 45 is rotated clockwise, stop members 41 and 42 approach each other to lessen the limits of travel in either direction possible for arm 40. Conversely, these limits can be increased by a counter-clockwise rotation of crank arm 45. If so desired, a separate hand crank may be provided to adjust stop member 42 independently of stop member 41, the coupling between the two stop members provided through shaft 50 in such case being eliminated.

The system of the invention thus provides simple yet highly effective and reliable means for controlling the maneuvering of a vehicle, instantaneous manual override of automatic control signals being provided and positive reliable limiting of the automatic control signals being afforded.

While the invention has been described and illustrated in detail, it is to be clearly understood that this is intended by way of illustration and example only and is not to be taken by way of limitation, the spirit and scope of the invention being limited only by the terms of the following claims.

I claim:

1. A system for controlling the maneuvering of a vehicle in response to both manually and automatically generated control signals comprising:
   a manual control device,
   means for generating a signal in accordance with the manipulation of said manual control device,
   means for generating an automatic control signal,
   means responsive to said automatic control signal for generating a mechanical signal in accordance therewith,
   stop means for limiting the extent of said mechanical signal,
   differential generator means for receiving said signal in accordance with the manipulation of said manual control device and said mechanical signal and generating a signal in accordance with the algebraic sum of said received signals,
   means for maneuvering the vehicle, and
   means responsive to the output of said differential generator means for driving said maneuvering means, said means for generating said mechanical signal in accordance with the automatic control signal comprising an electrical-mechanical transducer having a rotational output shaft, said stop means comprising a pair of mechanical stop members and a stop arm fixedly attached to said shaft and positioned between said stop members whereby both clockwise and counter-clockwise movement of said stop arm is limited by said stop members.

2. The system of claim 1 and further including means for adjusting the separation between said stop members to change the limits of travel of said stop arm.

3. The system of claim 2 wherein the means for adjusting the separation between the stop members comprises a hand crank and drive means coupling the hand crank to said stop members for driving said stop members towards and away from each other.

4. A system for controlling the maneuvering of a vehicle in response to both manually and automatically generated control signals comprising:
   a rotatable manual control device,
   a synchro transmitter coupled to said manual control device for generating an electrical signal in accordance with the angular rotation of said control device,
   an automatic control signal generator,
   a torquer connected to receive the output of said automatic control signal generator for generating a torque in accordance with said output, a synchro differential transmitter, the outputs of said torquer and of said automatic control signal generator being fed as inputs to said differential transmitter, the output of said differential transmitter being an electrical signal in accordance with the algebraic sum of the last mentioned inputs, stop means for limiting the angular rotation of said torquer thereby limiting the effect of said automatic control signal, means for maneuvering of the vehicle, and means responsive to the output of said differential transmitter for driving said maneuvering means, said stop means comprising a stop arm fixedly attached to the drive shaft of said torquer, and a pair of stop members positioned on opposite sides of said stop arm in the travel path thereof so as to limit both clockwise and counter-clockwise movement of said stop arm.

5. The system of claim 4 and further including means for adjusting the separation between said stop members to change the limits of travel of the stop arm.

6. The system of claim 1 wherein said means for adjusting the separation between said stop members comprises a hand crank and drive means coupling the hand crank to said stop members for driving said stop members towards and away from each other.

* * * * *